United States Patent Office 3,323,125
Patented May 30, 1967

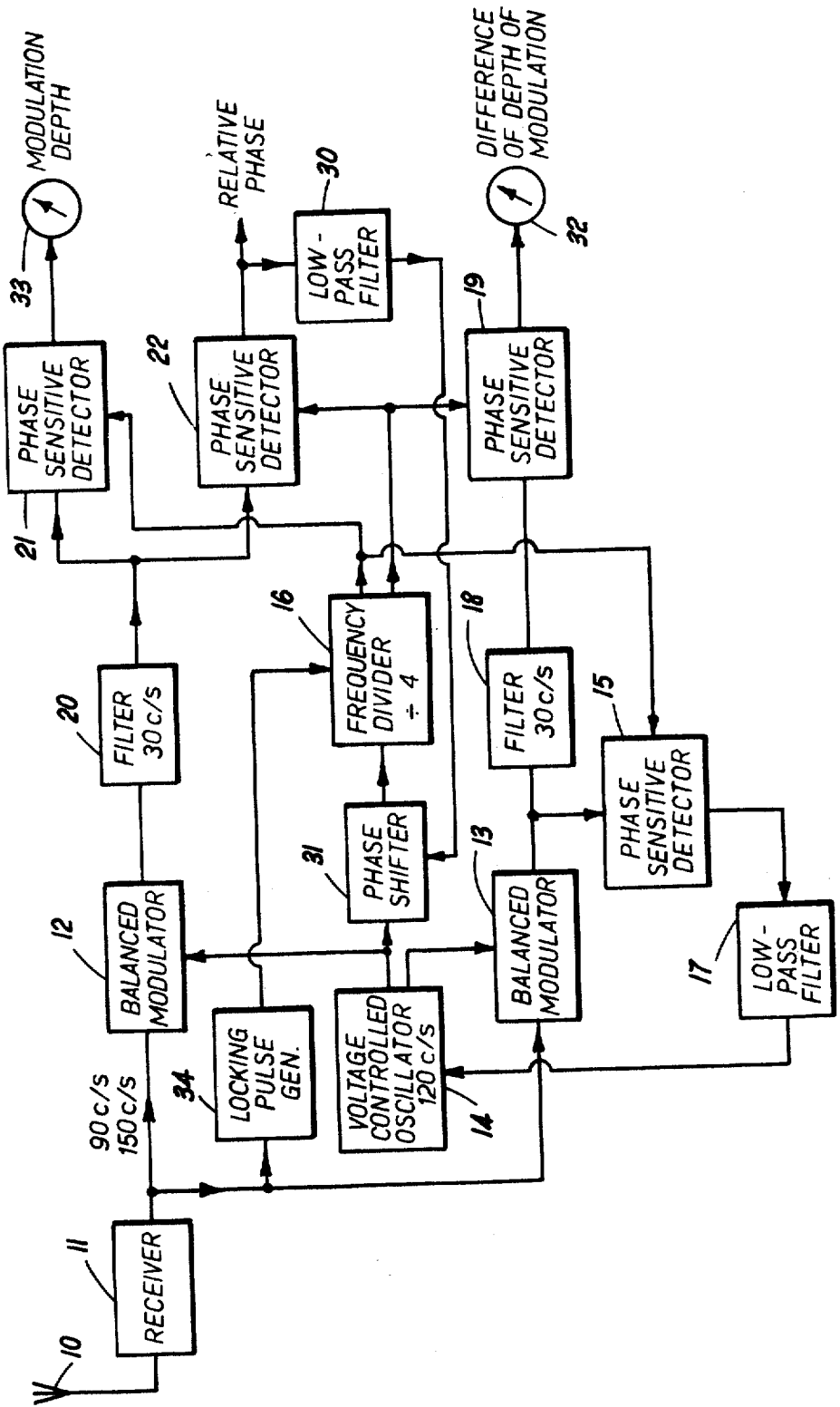

---

3,323,125
APPARATUS FOR COMPARING THE AMPLITUDES OF SIGNALS OF DIFFERENT FREQUENCIES
Gerald Keith Lunn and Edward James Grisley, both of Chessington, England, assignors to The Wayne Kerr Company Limited, Chessington, England, a British company
Filed Mar. 10, 1966, Ser. No. 533,211
Claims priority, application Great Britain, Apr. 13, 1965, 15,646/65
7 Claims. (Cl. 343—109)

ABSTRACT OF THE DISCLOSURE

In an airborne or ground monitor or control receiver for an I.L.S. system of the kind disclosed in U.S. Patent No. 3,302,202 (application Ser. No. 337,810), a phase sensitive detector is used to detect a 30 c./s. component in the output of a balanced modulator to which is applied the 90 c./s. and 150 c./s. input signals and a reference signal of 120 c./s. derived from the input signals. The output of the detector represents the deviation from the equi-signal course line or guide path. The present specification describes an automatic phase control for the 30 c./s. signal which signal is derived from the 120 c./s. reference signal by frequency division so enabling the sensitivity of the indication to be automatically maintained constant.

---

This invention relates to apparatus for comparing the amplitude of two signals of different frequency and particularly for comparing the amplitudes of modulation of two modulation signals of different frequency on a single carrier.

In U.S. Patent No. 3,302,202 there is described and claimed apparatus for comparing the amplitudes of two input signals of different frequencies comprising a signal source providing a reference signal of a frequency exactly mid-way between that of the two input signals, means for adjusting the phase of the reference signal (i.e. the mean frequency signal), a balanced modulator for amplitude modulating the phase-adjusted means frequency signal with the combined input signals and a detector, preferably a phase sensitive detector, for detecting the amplitude of the output signal from the balanced modulator at a frequency equal to half the difference between the frequencies of the two input signals. As is explained in the aforementioned specification, the mean frequency reference signal may readily be obtained from the two input signals. The expression "balanced modulator" is used to mean any device which acts as a multiplier of two electrical signals; that is to say a device giving an output to instantaneous amplitude of which is equal to product of the instantaneous amplitudes of the inputs. The detector of the above described appearatus provides an output signal at half the difference frequency which, provided the phase adjusting means are correctly set, is representative of the difference of amplitudes of the two inputs and is zero when these two inputs are equal.

This apparatus has particular application in the aircraft landing approach system known as I.L.S. (instrument landing system) in which guidance in the azimuth plane for the approach of an aircraft to the runway for landing is given by means of two directional ratio beams having the same carrier frequency, one being modulated at a frequency of 90 cycles per second and the other at a frequency of 150 cycles per second. These two beams partially overlap to give an equi-signal path indicating the line of approach to the runway and for this reason these two beams are referred to as the "localizer". In the I.L.S. system, glide path indication is also given in a somewhat similar manner using two beams on another carrier frequency which beams are modulated with the two modulation frequencies. As is explained in the aforementioned specification, the apparatus described therein enables the modulation amplitudes to be compared to a far higher degree of accuracy than is possible in systems, such as have been used heretofore, employing filters for separating the two modulation signals. The apparatus described above may be used not only on an aircraft to obtain guidance information which may be presented visually to the pilot or used in an automatic control system but it may also be used for monitoring the transmissions from the ground transmitters and/or for providing automatic control of the ground transmitters.

As is explained in the aforementioned specification, provided the phase of the reference signal is correctly adjusted, there will be no component of half the difference frequency in the output of the balanced modulator when the two input signals are of equal amplitude. In general, however, if the two input signals are of different amplitude, there will be an output at half the difference frequency. This may be considered as a vector which can be resolved into quadrature components. If the phase adjustment of the reference signal fed to the balanced modulator is correct, one of the resolved components is zero and the other is then a measure of the amplitude difference of the incoming modulated signals to be compared with the amplitude. These two components may be separated by using separate phase sensitive detectors and, as is explained in the aforementioned specification, the output of the phase sensitive detector responsive to that component which will be zero if the phase of the reference signal is correct may be used in an automatic phase control system for controlling the phase of the reference signal. In the British specification No. 1,046,558 published October 26, 1966, another form of automatic phase control of this reference signal is described and claimed in which means are provided for automatically controlling the phase of the reference signal in accordance with the integral of the output of a phase sensitive detector having a reference signal of a frequency equal to half the difference frequency of the input signals and having a phase such that the phase sensitive detector detects the component of the output of the balanced modulator arising due to phase error of the reference signal. By using the integrated output of a phase sensitive detector in this manner for automatically controlling the reference signal, the phase error in the reference signal can be brought to zero instead of having to leave a residual error to provide a sufficient correcting signal as in the arrangement more particularly described in the specification of the aforementioned U.S. Patent No. 3,302,202.

In an I.L.S. system, where the input frequencies are 90 and 150 c./s., the reference frequency is the mean frequency at 120 c./s. The phase sensitive detectors as described in the specification of the aforementioned U.S. Patent No. 3,302,202 and British specification No. 1,046,-558 published Oct. 26, 1966, have to operate at half the difference frequency that is to say 30 c./s. It is the conventional practice in I.L.S. equipment to derive the two modulation frequencies from a common source so that the mean frequency is always twice the difference frequency irrespective of any slight variation in the exact frequencies. With these particular frequencies, it is very convenient to derive the 30 c./s. reference signals for the phase sensitive detectors from the 120 c./s. reference signal for the balanced modulator by dividing down the frequency of the 120 c./s. reference signal for the balanced modulator by a factor of four. It is convenient, therefore, to use a multivibrator as the aforementioned voltage controlled oscillator, the multivibrator producing an output at 120 c./s. having a square waveform which can readily be divided in frequency by binary divider stages to give the required 30 c./s. reference signal. By using a multivibrator with binary dividers, the phase relationship between the 120 c./s. reference signal and the 30 c./s. signals can be preserved apart however from the ambiguities introduced by frequency division giving phase relations spaced exactly 90° apart. In the system described in the specification of the aforementioned Patent No. 3,302,202, a phase shifter is provided for adjusting the 30 c./s. signal and this may be used to correct not only for minor phase errors but also for the phase ambiguities. For most purposes and in particular in a ground monitor receiver located on the course line and in an airborne receiver, where it is required that null outputs are obtained when the aircraft is positioned correctly on the path defined by the localizer and glide path beams, the phase of the 30 c./s. signal is not critical provided it is approximately correct. Any error in the phase of the 30 c./s. does not affect the accuracy of the determination of the course line or glide path but only the sensitivity of the indication, that is to say the extent of deviation of the indicator for a given movement to one side or other of the course line. If the 30 c./s. is derived from the 120 c./s. signal, the automatic phase control of the 120 c./s. reference signal thus also maintains the 30 c./s. reference signal for the phase sensitive detector in the correct phase sufficiently accurately for course line guidance or for a ground monitor situated on the course line provided the frequency divider is correctly locked. It is thus possible in these arrangements therefore to dispense with any phase adjuster for the 30 c./s. reference signal if the frequency divider is correctly locked. This locking can be effected using a locking pulse generator deriving a short duration locking pulse from the 150 c./s. and 90 c./s. signals at the receiver. Reference may be made to the British specification No. 1,046,559 for a fuller description of a preferred form of locking pulse generator.

For some purposes, however, it may be required to determine the extent of derivation from the required course line. This arises, for example, if it is required that the aerial of a ground monitor receiver is located to one side of the course line. As another example a receiver in a calibration aircraft may be used for determining the radial course lines which are defined by non-equal amplitudes of the 90 c./s. and 150 c./s. signals. The present invention is directed to an improved form of receiver for this purpose.

According to this invention, in apparatus for comparing the amplitudes of two input signals of different frequencies comprising a signal source providing a mean frequency reference signal of a frequency exactly mid-way between that of the two signals, a first balanced modulator for amplitude modulating the mean frequency reference signal with the combined input signal, a first detector for detecting the amplitude of the output signal from the balanced modulator at a frequency equal to half the difference between the frequencies of the two input signals and means for automatically controlling the phase of the mean frequency referenec signal in accordance with the output of a phase sensitive detector having a reference signal equal to half the difference frequency of the input signals and having a phase such that the phase sensitive detector detects the component of the output of the balanced modulator arising due to phase error of the means frequency reference signal, there are provided a further balanced modulator for amplitude modulating, with the combined input signal, a signal in phase quadrature with said mean frequency reference signal, a further phase sensitive detector for detecting the output of said further balanced modulator using a reference signal at a frequency equal to half the difference between the frequencies of the two input signals but maintained in phase quadrature with the reference signal for the first mentioned phase sensitive detector and a phase shifter controlled by the output of said further phase sensitive detector for adjusting the phase of the two reference signals of frequency equal to half the difference between the frequencies of the two input signals so as to minimize the output of said further phase sensitive detector.

The aforesaid first detector gives an output, as explained in the aforementioned specifications which is proportional to the difference of the amplitudes of the input signals i.e. the difference of the depths of modulation in an I.L.S. system. The further phase sensitive detector gives an output representative of the relative phase between the two input signals to the receiver as is explained in the aforementioned co-pending applications. In I.L.S. systems the 90 and 150 c./s. signals are maintained in a standard phase relationship such that they both pass through zero going in the same direction at the same time. Thus whenever the receiver is in the radiation field, the output of this further phase sensitive detector should be zero provided the transmitters are correctly adjusted. If this output is not zero, then there is a phase error in the reference signal to this phase sensitive detector and hence this output can be used for controlling automatically, as described above, the phase of the reference signal fed to the phase sensitive detectors. In an I.L.S. system, this is a 30 c./s. signal and the arrangement described above thus gives automatic phase control of this 30 c./s. reference signal; the phase control of the 120 c./s. reference signal may be effected as described in the aforementioned specifications. The first mentioned detector is preferably also a phase sensitive detector using as the reference the 30 c./s. signal.

The control of the 30 c./s. reference signal is not critical and any convenient type of servo control system may be used. The controlled adjustment of phase may be proportional to the output of the phase sensitive detector or an integral control may be used to remove any residual error.

Preferably a low pass filter is included in the control circuit so that the control is responsive only to the slowly changing D.C. component in the output of the phase sensitive detector, the filter removing any 30 c./s. and higher frequency components from the output of this detector. This low pass filter may be constituted by a high gain amplifier arranged as an integrating circuit and so giving a very high gain for the D.C. component.

If, as is convenient, the 30 c./s. reference signal is obtained by dividing down the frequency of the 120 c./s. reference signal, conveniently the phase shifter for effecting the adjustment of the phase of the 30 c./s. signal is in the input to the frequency divider, shifting the phase of the 120 c./s. signal fed to this frequency divider. In such an arrangement, to ensure that the frequency divider is locked to the appropriate cycle of the 120 c./s. signal a locking pulse generator deriving a locking pulse for the received signals may be employed as described and claimed in the British specification No. 1,046,559.

By using a binary frequency divider, as is described for example in the specification of the aforementioned British specification No. 1,046,558, the two 30 c./s. reference signals can be obtained in phase quadrature, the phase of both signals being adjusted simultaneously by the phase control of the 120 c./s. input to the divider.

It will be seen that the arrangement of the present invention provides a very simple and convenient means of automatically controlling the phase of the 30 c./s. reference signals which is particularly suitable for an airborne I.L.S. receiver where lightness of weight and hence the minimum of components is desirable and where automatic control of the 30 c./s. reference signals is desired so that the sensitivity of the receiver is maintained constant. This construction is also particularly suitable for a ground monitor for monitoring or controlling the transmissions from the transmitting equipment in an I.L.S. system since it enables the monitoring to be effected automatically even if the monitor receiver is not on the course line by ensuring that the sensitivity of receiver is maintained constant.

In the following description of one embodiment of the invention, reference will be made to the accompanying drawing which is a diagram illustrating a receiver for an I.L.S. system suitable as an airborne calibration receiver or for a monitor station for a ground transmitting equipment of an I.L.S. system.

Referring to the drawing, the transmitted signals are picked up by an aerial 10 and fed to a receiver 11 including a detector to provide output signals including the 90 c./s. and 150 c./s. modulation tones which are fed to two balanced modulators 12 and 13. Each balanced modulator, as previously explained, is a device which acts as a multiplier of two electrical signals, that is to say a device giving an ouput the instantaneous amplitude of which is equal to the product of the instantaneous amplitudes of the inputs. The signals received from the receiver 11 are multiplied in the balanced modulators 12 and 13 respectively by 120 c./s. signals in phase quadrature from a reference signal generator 14 which is controlled in frequency and phase in a manner to be described later. The reference signal generator 14 is a voltage controlled oscillator providing two outputs in phase quadrature which are fed respectively to the two balanced modulators 12, 13. Conveniently, to provide these phase quadrature outputs, the oscillator 14 generates signals at 240 c./s. which are divided in frequency by two separate divide-by-two frequency dividers locked to opposite polarity half sycles of the 240 c./s. signals, thereby enabling two signals at 120 c./s. to be obtained exactly in phase quadrature. From the balanced modulator 13, the 30 c./s. signal is detected by a phase sensitive detector 15 having a reference input of 30 c./s. derived from a frequency divider 16 which divides down the frequency of one of the 120 c./s. outputs from the oscillator 14 by a factor of four. It will be noted that the frequency divider 16 is fed from that output of the oscillator 14 which is applied to the balanced modulator 12, this being in quadrature with the output applied to the balanced modulator 13. The output from the phase sensitive detector 15 includes direct voltage components which are used as control. By using a voltage representative of the phase error 14 and for this purpose the output from the detector 15 is fed through a low pass filter 17 passing the direct voltage components but rejecting higher frequencies before being applied to the oscillator 14 as a frequency control. By using a voltage representative of the phase error and applying it as a frequency control, in effect the phase error is integrated before being corrected. If any phase error is detected, this will produce a direct voltage of magnitude and polarity such as to cause an alteration of the frequency of the oscillator 14 in a direction tending to correct the phase error and the correction will continue until all the accumulated phase error has been removed. The phase and frequency of the oscillator output is thus maintained in the required condition. The direct voltage components are used for controlling the frequency and the low pass filter 17 conveniently is a high gain amplifier, preferably with a capacitive feedback to form an integrator and to give a very high gain for the direct voltage components.

The output from the balanced modulator 13 is also fed, through a low pass filter 18 which passes the 30 c./s. component but rejects higher frequencies, to a phase sensitive detector 19 having a 30 c./s. reference signal obtained from the frequency divider 16.

In the embodiment illustrated, the oscillator 14 is a multivibrator providing a square wave output and the frequency divider 16 comprises two binary divider stages. The use of a square wave oscillator and binary divider stages enables the phase of the 30 c./s. reference signal fed to the phase sensitive detector 15 with respect to the phase of the 120 c./s. reference signal readily to be preserved to the required degree of accuracy. The frequency divider 16 provides two outputs which are in phase quadrature and the signal fed to the phase sensitive detector 19 is in quadrature with that applied to phase sensitive detector 15 so that the output from the phase sensitive detector 19 is a direct voltage having an amplitude representative of the difference of amplitudes of the 90 and 150 c./s. signals, the output from the phase sensitive detector 19 being zero when the 90 and 150 c./s. signals are of equal amplitude. This output may be applied to an indicating meter or recorder for monitoring purposes or, in the case of a ground monitor, may be used as a control voltage for controlling the relative amplitudes of the two signals radiated by the transmitter.

The output from the balanced modulator 12 is passed through a low pass filter 20 passing the 30 c./s. components but rejecting higher frequencies and is then applied to two phase sensitive detectors 21 and 22. These are fed with 30 c./s. reference signals in phase quadrature from the frequency divider 16. The output from the phase sensitive detector 21 is proportional to the mean of the depths of modulation of the two received signals. Since the transmitting system will be controlled so that these two depths of modulation are equal, the output from the phase sensitive detector 21 is thus a measure of the depth of modulation and, in the case of a ground monitor, may be used for control purposes at the transmitter and/or indicated on an indicator or recorder 33. The output from the phase sensitive detector 22 represents the relative phase of the 90 and 150 c./s. signals. If these signals are in the standard phase relationship used in I.L.S. systems, that is they both pass through zero going in the same direction at the same time, then the output from the phase sensitive detector 22 is zero. In an I.L.S. transmitting system, the 90 and 150 c./s. signals are maintained in this phase relationship. Thus, if there is any output from the phase sensitive detector 22, this output is representative of a phase error in the 30 c./s. reference phase fed to the phase sensitive detector 22. The error is represented by a direct voltage signal and the output from the phase sensitive detector 22 is passed through a low pass filter 30 to remove any 30 c./s. and higher frequency components and then applied as a control signal to a phase shifter 31 in the input to the frequency divider 16. This forms a closed loop control for the 30 c./s. reference phase; a simple control of phase linearly dependent on the amplitude and polarity of the output from the filter 30 may be employed or a more complex servo system, e.g. an integral system operating on the integrated direct voltage output, may be employed. The filter 30 may conveniently be constituted by a high gain amplifier having a capacitive feedback to form an integrator, i.e. an amplifier having a very high gain for the direct voltage component.

By providing this automatic control of the phase of the 30 c./s. reference signals for the phase sensitive detectors, the effect of any error in the phase of these signals on the indication of difference of depth of modulation is removed. The output of the phase sensitive detector 19 may now be used not only for accurate determination of zero difference of depth of modulation but also for flying on a course line (or monitoring a course line) which is off-set to one side or other of the zero line. This off-set course line may be defined as a predetermined reading on a direct current meter 32 fed from the phase sensitive detector 19 or provision may be made, as described and claimed in the specification of copending U.S. application Ser. No. 533,212, filed Mar. 10, 1966, to give a zero current indication on a meter with a predetermined output from the phase sensitive detector 19. To ensure that the outputs of the frequency divider 16 are locked to the appropriate cycles of the 120 c./s. signal from the oscillator 14, a locking pulse generator 34 is provided which produces, from the output of the receiver 11, a synchronising pulse for locking the divider 16. Reference may be made to the specification of British specification No. 1,046,559 for a description of a particularly suitable form of circuit for this purpose which will produce pulses at any required point in the period of the 30 c./s. signal. If the 120 c./s. oscillator 14 generates signals at 240 c./s. which are divided in frequency by a factor or two as explained above, then the pulse output from the locking pulse generator 34 is used also to lock this divider and thereby to select the required phase quadrature relationship out of the two alternative phase quadrature relationships which are possible using such a divider.

By providing the automatic phase and frequency control of the 120 c./s. signal, and of the 30 c./s. signal the outputs from the phase sensitive detectors 19 and 21 are properly maintained to represent the required information. In particular, by employing the control of the phase of the 30 c./s. signal from the output of the phase sensitive detector 22, the phase of the 30 c./s. reference signals may be accurately maintained and so changes in the sensitivity of the indicator 32 due to phase errors in the 30 c./s. signal are avoided. This control of the 30 c./s. reference signal also avoids changes in the sensitivity of the indication of depths of modulation by the output of the phase sensitive detector 21 due to phase errors in the 30 c./s. signal.

Although in the arrangement described above the 30 c./s. reference signal is obtained by dividing down the frequency of the 120 c./s. signal, the separate control loops for controlling the phase of the 30 c./s. and 120 c./s. reference signals can be used in a similar manner if these signals are derived in other ways, e.g. if the 120 c./s. signal is obtained by frequency multiplying of the 30 c./s. signal.

We claim:

1. Apparatus for comparing the amplitudes of two input signals of different frequencies comprising a signal source providing a mean frequency reference signal of a frequency exactly mid-way between that of the two input signals, a first balanced modulator for amplitude modulating the mean frequency reference signal with the combined input signal, a first detector for detecting the amplitude of the output signal from the balanced modulator at a frequency equal to half the difference between the frequencies of the two input signals, a first phase sensitive detector fed from said first balanced modulator, means responsive to said two input signals providing first and second reference signals of frequency equal to half the difference frequency of the input signals and in phase quadrature, means for applying said first reference signal of half said difference frequency to said first phase sensitive detector as a reference signal having a phase such that the phase sensitive detector detects the component of the output of the balanced modulator arising due to phase error of the reference signal, means for automatically controlling the phase of the mean frequency reference signal in accordance with the output of said first phase sensitive detector, a further balanced modulator for amplitude modulating, with the combined input signal, a signal in phase quadrature with said mean frequency reference signal, a further phase sensitive detector for detecting the output of said further balanced modulator using said second reference signal at a frequency equal to half the difference between the frequencies of the two input signals and a phase shifter controlled by the output of said further phase sensitive detector for adjusting the phase of the both said first and said second reference signals of frequency equal to half the difference between the frequencies of the two input signals so as to minimize the output of said further phase sensitive detector.

2. Apparatus as claimed in claim 1, wherein said first detector is a phase sensitive detector using, as a reference, the reference signal used for said further phase sensitive detector.

3. Apparatus as claimed in claim 1, wherein a low pass filter is included in the control circuit for said phase shifter so that the control is responsive only to the slowly changing D.C. component in the output of said further phase sensitive detector.

4. Apparatus as claimed in claim 3, wherein the low pass filter is constituted by a high gain amplifier arranged as an integrator.

5. In an I.L.S. system of comparing the amplitudes of two input signals of frequencies 90 c./s. and 150 c./s. received as modulations on carriers of the same frequency, the combination of means for receiving said signals, means responsive to the received signals providing a mean frequency reference signal of a frequency exactly mid-way between that of the two input signals, a first balanced modulator for amplitude modulating the mean frequency reference signal with the combined input signal, a first detector for detecting the amplitude of the output signal from the balanced modulator at a frequency equal to half the difference between the frequencies of the two input signals, a first phase sensitive detector fed from said first balanced modulator, means responsive to said two input signals providing first and second reference signals of frequency equal to half the difference frequency of the input signals and in phase quadrature, means for applying said first reference signal of half said difference frequency to said first phase sensitive detector as a reference signal having a phase such that the phase sensitive detector detects the component of the output of the balanced modulator arising due to phase error of the reference signal, means for automatically controlling the phase of the mean frequency reference signal in accordance with the output of said first phase sensitive detector, a further balanced modulator for amplitude modulating, with the combined input signal, a signal in phase quadrature with said mean frequency reference signal, a further phase sensitive detector for detecting the output of said further balanced modulator using said second reference signal at a frequency equal to half the difference between the frequencies of the two input signals and a phase shifter controlled by the output of said further phase sensitive detector for adjusting the phase of the two reference signals of frequency equal to half the difference between the frequencies of the two input signals so as to bring the output from said further phase sensitive detector towards zero.

6. Apparatus as claimed in claim 5, wherein said means for providing the reference signals of a frequency equal to half the difference between the frequencies of the two input signals comprises a frequency divider dividing down the frequency of the mean frequency reference signal, and wherein said phase shifter is in the input to the frequency divider.

7. Apparatus as claimed in claim 6, wherein said frequency divider is a binary frequency divider.

References Cited

UNITED STATES PATENTS

| 2,193,801 | 3/1940 | Byrne | 325—329 |
| 2,418,284 | 4/1947 | Winchel et al. | 324—140 X |
| 3,281,846 | 10/1966 | King | 343—107 |

RODNEY D. BENNETT, *Primary Examiner.*

CHESTER L. JUSTUS, *Examiner.*

H. C. WAMSLEY, *Assistant Examiner.*